(12) United States Patent
Kock et al.

(10) Patent No.: US 9,732,209 B2
(45) Date of Patent: Aug. 15, 2017

(54) HIGH FLOW AND STIFF POLYMER MATERIAL WITH GOOD TRANSPARENCY AND IMPACT PROPERTIES

(75) Inventors: Cornelia Kock, Pucking (AT); Christelle Grein, Linz (AT); Floran Prades, Linz (AT)

(73) Assignee: Borealis AG, Vienna (AT)

( * ) Notice: Subject to any disclaimer, the term of this patent is extended or adjusted under 35 U.S.C. 154(b) by 759 days.

(21) Appl. No.: 13/823,249

(22) PCT Filed: Sep. 12, 2011

(86) PCT No.: PCT/EP2011/065703
§ 371 (c)(1),
(2), (4) Date: May 28, 2013

(87) PCT Pub. No.: WO2012/034956
PCT Pub. Date: Mar. 22, 2012

(65) Prior Publication Data
US 2013/0253125 A1 Sep. 26, 2013

(30) Foreign Application Priority Data
Sep. 16, 2010 (EP) .................... 10177133

(51) Int. Cl.
C08L 23/14 (2006.01)
C08L 23/10 (2006.01)
C08K 5/00 (2006.01)
C08L 23/08 (2006.01)
C08L 23/16 (2006.01)
C08L 23/06 (2006.01)

(52) U.S. Cl.
CPC .............. *C08L 23/14* (2013.01); *C08L 23/10* (2013.01); *C08K 5/0083* (2013.01); *C08L 23/06* (2013.01); *C08L 23/0815* (2013.01); *C08L 23/16* (2013.01); *C08L 2205/025* (2013.01); *C08L 2205/03* (2013.01); *C08L 2205/035* (2013.01); *C08L 2207/02* (2013.01); *C08L 2308/00* (2013.01); *C08L 2666/04* (2013.01)

(58) Field of Classification Search
CPC ....... C08K 5/0083; C08L 23/14; C08L 23/10; C08L 23/0815; C08L 23/16; C08L 2205/035; C08L 2207/02; C08L 2308/00; C08L 23/06; C08L 2205/025; C08L 2205/03; C08L 2666/04
USPC ........................................................ 524/528
See application file for complete search history.

(56) References Cited

U.S. PATENT DOCUMENTS

2006/0142495 A1\* 6/2006 Lalho ............... C08L 23/10 525/240

FOREIGN PATENT DOCUMENTS

| EP | 0491566 A2 | 6/1992 |
|---|---|---|
| EP | 0887379 A1 | 12/1998 |
| EP | 1659151 A | 5/2006 |
| EP | 1873203 A1 | 2/2008 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9924478 A1 | 5/1999 |
| WO | 9924479 A1 | 5/1999 |
| WO | 0068315 A1 | 11/2000 |
| WO | 0244272 A1 | 6/2002 |
| WO | 04/000899 A1 | 12/2003 |
| WO | 2004/111095 A1 | 12/2004 |

OTHER PUBLICATIONS

Wen-Jun Wang & Sniping Zhu, "Structural Analysis of Ethylene/Propylene Copolymers Synthesized with a Constrained Geometry Catalyst", Macromolecules, 2000, vol. 33, pp. 1157-1162, Published on Web Jan. 22, 2000.
Gurmeet Singh, Ajay V. Kothari, Virendra K. Gupta, "Triad sequence determination of ethylene-propylene copolymers—application of quantitative 13 C NMR", Polymer Testing, 2009, vol. 28, pp. 475-479, Elsevier Ltd.
Luigi Resconi, Luigi Cavallo, Anna Fait & Fabrizio Piemontesi, "Selectivity in Propene Polymerization with Metallocene Catalysts", Chem. Rev., 2000, vol. 100, pp. 1253-1345, American Chemical Society, Published on Web Mar. 25, 2000.
James C. Randall, "A Review of High Resolution Liquid 13 Carbon Nuclear Magnetic Resonance Characterizations of Ethylene-Based Polymers", JMS—Rev. Macromol. Chem. Phys., 1989, vol. C29(2 & 3), pp. 201-317, Marcel Dekker, Inc.
Masahiro Kakugo, Yukio Naito, Kooji Mizunuma & Tatsuya Miyatake, "13 C NMR Determination of Monomer Sequence Distribution in Ethylene-Propylene Copolymers Prepared with -TiCL3-Al(C2H5)2Cl", Macromolecules, 1982, vol. 15, pp. 1150-1152, American Chemical Society.
H. N. Cheng, "13 C NMR Analysis of Ethylene-Propylene Rubbers", Macromolecules, 1984, vol. 17, pp. 1950-1955, American Chemical Society.
Vincenzo Busico, Roberta Cipullo, Guglielmo Monaco, Michele Vacatello & Anna Laura Segre, Full Assignment of the 13 C NMR Spectra of Regioregular Polypropylenes: Methyl and Methylene Region, Macromolecules, 1997, vol. 30, pp. 6251-6263, American Chemical Society.

(Continued)

*Primary Examiner* — Angela C Scott
(74) *Attorney, Agent, or Firm* — Warn Partners, P.C.

(57) ABSTRACT

Polypropylene composition having a melt flow rate $MFR_2$ (230° C.) of equal or above 15 g/10 min comprising: (a) a crystalline polypropylene matrix; (b) an elastomeric propylene copolymer phase having a propylene content in the range of 40 to 80 wt.-%, and an intrinsic viscosity in the range of more than 0.7 to less or equal 2.5 dl/g; (c) a first polyethylene having a density in the range 905 to 925 kg/m3 and melt flow rate $MFR_2$ (190° C.) of below 30 g/10 min; (d) a second polyethylene having a density of above 915 kg/m$^3$, and a melt flow rate $MFR_2$ (190° C.) of equal or above 30 g/10 min.

15 Claims, 2 Drawing Sheets

(56) References Cited

OTHER PUBLICATIONS

Vincenzo Busico, Philippe Carbonniere, Roberta Cipullo, Roberta Pellecchia, John R. Severn & Givoanni Talarico, "Alk-1-ene Polymerization in the Presence of a Monocyclopentadienyl Zirconium (IV) Acetamidinate Catalyst: Microstructural and Mechanistic Insights", Macromolecular Rapid Communications, 2007, vol. 28, pp. 1128-1134, Wiley InterScience, Wiley-VCH Verlag GmbH & Co. KGaA, Weinheim.
Vincenzo Busico & Roberta Cipullo, "Microstructure of Polypropylene", Progress in Polymer Science, 2001, vol. 26, pp. 443-533, Elsevier Science Ltd.
Zhe Zhou, Rainer Kummerle, Xiaohua Qiu, David Redwine, Rongjuan Cong, Angela Taha, Dan Baugh & Bill Winniford, "A new decoupling method for accurate quantification of polyethylene copolymer composition and triad sequence distribution with 13 C NMR", Journal of Magnetic Resonance, 2007, vol. 187, pp. 225-233, Elsevier Inc.
International Search Report and Written Opinion for International Application No. PCT/EP2011/065703 Filed on Sep. 12, 2011.
Borealis A/S (Oct. 10, 2008) Borealis PE MA9230 [Product Data Sheet].
Borealis AG (Feb. 26, 2014) Polyethylene CA9150 [Product Data Sheet].
Borealis AG (Jan. 1, 2016) Polyethylene MA8200 [Product Data Sheet].

\* cited by examiner

HIGH FLOW AND STIFF POLYMER MATERIAL WITH GOOD TRANSPARENCY AND IMPACT PROPERTIES

CROSS REFERENCE TO RELATED APPLICATIONS

This application is a National Stage of International Application No. PCT/EP2011/065703, filed Sep. 12, 2011. This application claims priority to European Patent Application No. 10177133.5 filed Sep. 16, 2010. The disclosures of the above applications are incorporated herein by reference.

The present invention is directed to a new heterophasic polypropylene system showing good balance between stiffness and impact at low haze, as well as to its use for injection molded articles.

Heterophasic propylene copolymers are well known in the art. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high resolution microscopy, like electron microscopy or scanning force microscopy.

One application of the heterophasic propylene copolymers is its use as packaging material. High flow and stiff heterophasic propylene copolymers for transparent thin wall packaging applications showing high impact strength at low temperatures (as it is required for ice cream packaging) are challenging to develop. The problem is that by improving one of these relevant features the others are negatively influenced. For instance good transparency requires small enough particles dispersed in the matrix (typically with diameters <400 nm) so that they do not scatter light. However, small particles are detrimental for low temperature impact strength. Another way to get transparency is to adapt the refractive indexes from the matrix and that of the dispersed phase by PE-addition. Further also the melt flow behavior can be negatively influenced.

Accordingly the object of the present invention is to find a polypropylene composition suitable for transparent thin wall packaging. Therefore a high flow polypropylene composition needs to be developed which is stiff and transparent and further show good impact at low temperatures.

The finding of the present invention is to provide a heterophasic propylene copolymer with rather high melt flow rate, said system comprises in addition to a crystalline polypropylene matrix and an elastomeric propylene copolymer phase, two polyethylenes which differ in density and melt flow rate.

Accordingly the present invention is directed to a polypropylene composition having a melt flow rate $MFR_2$ (230° C.) measured according to ISO 1133 of equal or above 15 g/10 min comprising
(a) a crystalline polypropylene matrix (M-PP)
(b) an elastomeric propylene copolymer phase (E) having
 (i) a propylene content in the range of 40 to 80 wt.-%, and
 (ii) an intrinsic viscosity (IV) measured according to ISO 1628-1 (at 135° C. in decalin) in the range of more than 0.7 to less or equal 2.5 dl/g,
(c) a first polyethylene (PE1) having
 (i) a density measured according to ISO 1183-187 in the range 905 to 925 kg/m³, and
 (ii) a melt flow rate $MFR_2$ (190° C.) measured according to ISO 1133 of equal or below 30 g/10 min,
(d) a second polyethylene (PE2) having
 (i) a density measured according to ISO 1183-187 of above 915 kg/m³, and
 (ii) a melt flow rate $MFR_2$ (190° C.) measured according to ISO 1133 of equal or above 30 g/10 min.

It has been surprisingly found out that such a polypropylene composition has excellent transparency, high stiffness, good impact at low temperatures and good flowability compared to products know in the art.

BRIEF DESCRIPTION OF THE DRAWINGS

The present invention will become more fully understood from the detailed description and the accompanying drawings, wherein.

Figure 1:
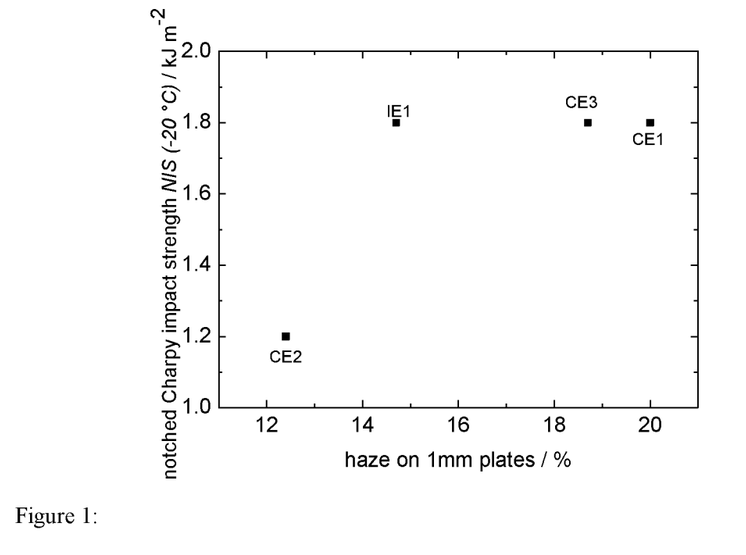
FIG. 1 shows a plot comparing notched charpy impact strength N/S relative to haze on 1 mm plates of the inventive example 1 and the comparative examples 1 to 3.
Figure 2:
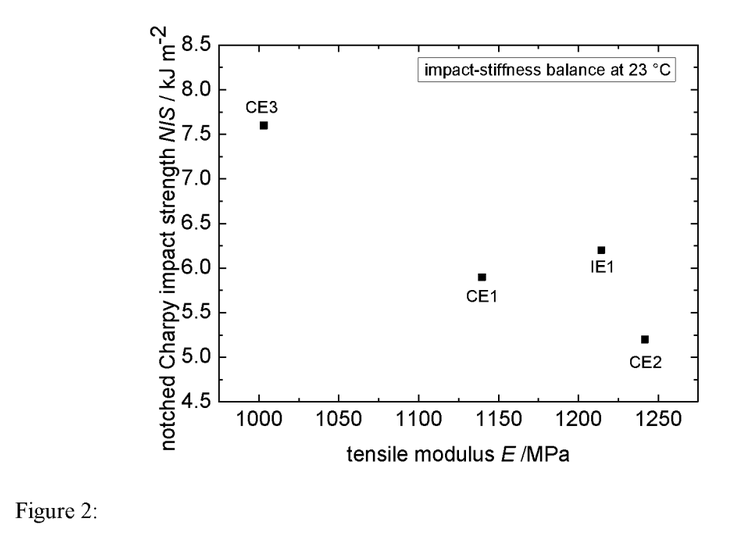
FIG. 2 shows a plot comparing notched charpy impact strength N/S relative to tensile modulus E of the inventive example 1 and the comparative examples 1 to 3 (impact-stiffness balance at 23° C.)
Figure 3:
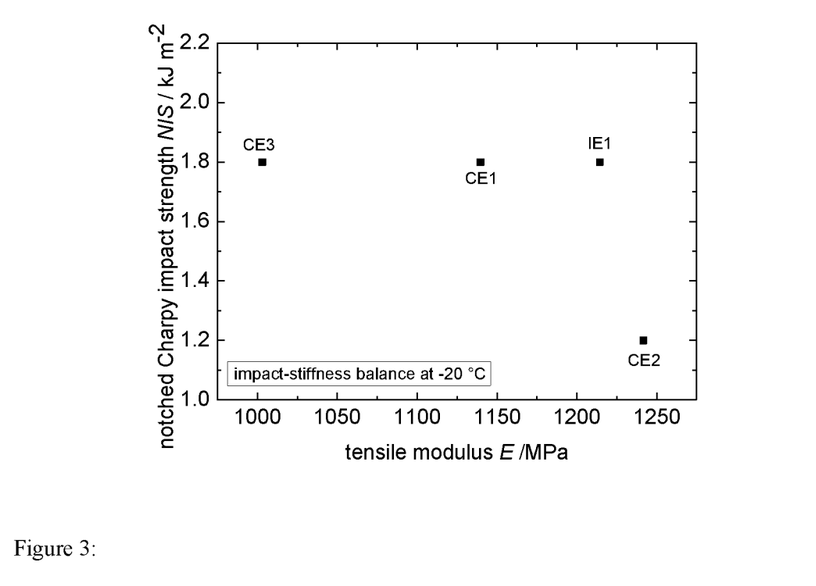
FIG. 3 shows a plot comparing notched charpy impact strength N/S relative to tensile modulus E of the inventive example 1 and the comparative examples 1 to 3 (impact-stiffness balance at −20° C.)
Figure 4:
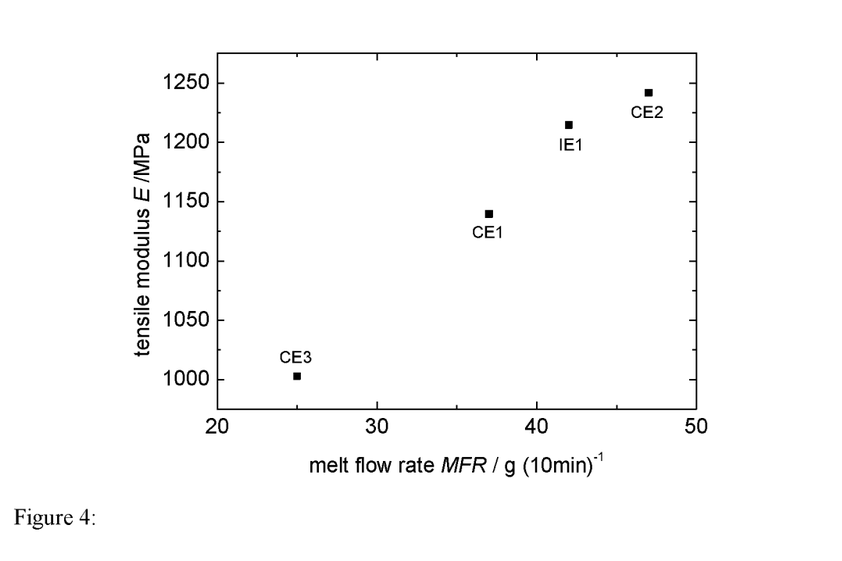
FIG. 4 shows a plot comparing tensile modulus E relative to melt flow rate of the inventive example 1 and the comparative examples 1 to 3.

In the following the invention is described in more detail.

The present invention is preferably a propylene composition being a heterophasic system. The expression "heterophasic" indicates that an elastomeric phase is (finely) dispersed in a matrix. In other words the elastomeric phase forms inclusions in the matrix. Thus the matrix contains (finely) dispersed inclusions being not part of the matrix and said inclusions contain the elastomeric material. The term "inclusion" according to this invention shall preferably indicate that the matrix and the inclusion form different phases within the heterophasic propylene copolymer, said inclusions are for instance visible by high resolution microscopy, like electron microscopy or scanning force microscopy.

Accordingly the crystalline polypropylene matrix (M-PP) constitutes the matrix of the propylene composition being a heterophasic system. While the matrix of said system only constitutes of the crystalline polypropylene matrix (M-PP), the disperse phase constitutes of the elastomeric propylene copolymer phase (E), the first polyethylene (PE1) and the second polyethylene (PE2), preferably in the form of "core-shell" particles with the elastomeric propylene copolymer phase (E) forming the amorphous "shell" and the first polyethylene (PE1) and/or the second polyethylene (PE2) forming the crystalline "core" of said particles.

The inventive propylene composition, i.e. the propylene composition being a heterophasic system, may contain further additives, like α-nucleating agents (see below), but no other polymer in an amount exceeding 7.0 wt.-%, more preferably exceeding 6.0 wt.-%, like exceeding 5.5 wt.-%, based on the total propylene composition. One additional polymer which may be present in such low amounts is a crystalline polyethylene insoluble in cold xylene which is a by-reaction product obtained by the preparation of the heterophasic propylene copolymer (see in detail below). Accordingly it is in particular appreciated that the instant polypropylene composition contains only the polymer components indicated above and optionally crystalline polyethylene in amounts as mentioned in this paragraph.

The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that the inventive polypropylene composition has a melt flow rate $MFR_2$ (230° C.) of equal or more than 15 g/10 min, more preferably of at least 20 g/10 min, yet more preferably in the range of 15 to 100 g/10 min, still more preferably of 20 to 80 g/10 min, yet still more preferably in the range of 30 to 70 g/10 min.

Preferably the total polypropylene composition has a xylene cold soluble fraction (XCS) measured according to ISO 6427 in the range of 15 to 30 wt.-%, more preferably in the range of 18 to 25 wt.-%.

Further the hexane soluble content shall be not too high. Accordingly it is appreciated that the polypropylene composition has a hexane soluble content measured according FDA section 177.1520 of below 5.5 wt.-%, more preferably in the range of 3.0 to 5.0 wt.-%.

Further the inventive polypropylene composition is featured by good optical properties. Accordingly the polypropylene composition has preferably
(a) a haze measured according to ASTM D1003 (1.0 mm specimen) equal or below 45%, more preferably equal or below 40%, still more preferably in the range of 15 to 40%, and/or
(b) a haze measured according to ASTM D1003 (0.5 mm specimen) equal or below 25%, more preferably equal or below 20%, still more preferably in the range of 5 to 25%.

Alternatively or additionally the polypropylene composition has preferably
(a) a transparency measured according to ASTM D1003 (1.0 mm specimen) equal or more than 70%, more preferably equal or more than 80%, still more preferably in the range of 78 to 95%,
and/or
(b) a transparency measured according to ASTM D1003 (0.5 mm specimen) equal or more than 75%, more preferably equal or more than 85%, still more preferably in the range of 85 to 98%.

Further the inventive propylene composition is featured by high impact. Accordingly the inventive propylene composition has
(a) an Charpy notched impact determined according to ISO 179/1 eA at 23° C. of equal or more than 5.0 $kJ/m^2$, more preferably equal or more than 6.0 $kJ/m^2$, still more preferably in the range of 5.5 to 10.0 $kJ/m^2$, and/or
(a) an Charpy notched impact determined according to ISO 179/1 eA at −20° C. of equal or more than 1.3 $kJ/m^2$, more preferably equal or more than 1.6 $kJ/m^2$, still more preferably in the range of 1.5 to 5.0 $kJ/m^2$.

Additionally the inventive polypropylene composition is rather stiff, i.e. has a tensile modulus measured according to ISO 527-3 of at least 1000 MPa, more preferably of at least 1100 MPa, yet more preferably of at least 1200 MPa, still more preferably in the range of 1100 to 1800 MPa.

In the following the individual components of the instant invention are described in more detail.

As stated above the instant invention is a heterophasic system. The heterophasic system has been preferably obtained by mixing the two polyethylenes (PE1) and (PE2) with a heterophasic propylene copolymer (HECO) comprising the crystalline polypropylene matrix (M-PP) and the elastomeric propylene copolymer phase (E). Accordingly in the following the heterophasic propylene copolymer (HECO) without the two polyethylenes (PE1) and (PE2) is defined more precisely.

The heterophasic propylene copolymer (HECO) comprises the crystalline polypropylene matrix (M-PP) which constitutes preferably the matrix of the heterophasic propylene copolymer (HECO) and dispersed therein the elastomeric propylene copolymer phase (E). Preferably the crystalline polypropylene matrix (M-PP) and the elastomeric propylene copolymer phase (E) are the only polymer components of the heterophasic propylene copolymer (HECO). Only minor amounts of crystalline polyethylene as indicated above may additionally present in amounts not exceeding 7.0 wt.-%.

Preferably the heterophasic propylene copolymer (HECO) has a melt flow rate $MFR_2$ (230° C.) measured according to ISO 1133 of equal or more than 20 g/10 min, more preferably of equal or more than 25 g/10 min, yet more preferably in the range of 20 to 100 g/10 min, still more preferably of 20 to 80 g/10 min, yet still more preferably in the range of 30 to 70 g/10 min.

Preferably it is desired that the heterophasic propylene copolymer (HECO) is thermomechanically stable. Accordingly it is appreciated that the heterophasic propylene copolymer (HECO) has a melting temperature of at least 155° C., more preferably of at least 158° C., still more preferably in the range of 158 to 165° C.

Preferably the propylene content in the heterophasic propylene copolymer (HECO) is 75.0 to 95.0 wt.-%, more preferably 82.0 to 92.0 wt.-%, based on the total heterophasic propylene copolymer (HECO), more preferably based on the amount of the polymer components of the heterophasic propylene copolymer (HECO), yet more preferably based on the amount of the crystalline polypropylene matrix (M-PP) and the elastomeric propylene copolymer phase (E) together. The remaining part constitutes the comonomers as defined for the crystalline polypropylene matrix (M-PP) and the elastomeric propylene copolymer phase (E), respectively, preferably ethylene.

The xylene cold soluble (XCS) content measured according to ISO 6427 (23° C.) of the heterophasic propylene copolymer (HECO) is preferably in the range of 12 to 30 wt.-%, more preferably in the range of 15 to 25 wt.-%.

Preferably the crystalline polypropylene matrix (M-PP) has a melt flow rate $MFR_2$ (230° C.) measured according to ISO 1133 of equal or more than 30 g/10 min, more preferably of equal or more than 40 g/10 min, yet more preferably in the range of 30 to 100 g/10 min, still more preferably of 40 to 90 g/10 min, yet still more preferably in the range of 40 to 80 g/10 min.

Further it is desired that the crystalline polypropylene matrix (M-PP) is thermomechanically stable. Accordingly it is appreciated that the crystalline polypropylene matrix (M-PP) has a melting temperature of at least 145° C., more preferably of at least 155° C., still more preferably in the range of 158 to 165° C.

The xylene cold soluble (XCS) content measured according to ISO 6427 (23° C.) of the crystalline polypropylene matrix (M-PP) is preferably equal or below 4.0 wt.-%, more preferably equal or below 3.5 wt.-%, still more preferably in the range of 0.5 to 4.0 wt.-%, like in the range of 0.5 to 3.5 wt.-%.

The crystalline polypropylene matrix (M-PP) is preferably a propylene homopolymer (H-PP), a random propylene copolymer (R-PP), or a mixture of a propylene homopolymer (H-PP) and a random propylene copolymer (R-PP), the latter especially preferred.

Accordingly it is appreciated that the crystalline polypropylene matrix (M-PP) has a comonomer content of equal or less than 4.0 wt.-%, more preferably equal or less than 3.0 wt.-%, still more preferably in the range of more than 0.3 to equal or less than 4.0 wt.-%, more preferably in the range of more than 0.3 to equal or less than 2.0 wt.-%.

The expression propylene homopolymer used in the instant invention relates to a polypropylene that consists substantially, i.e. of more than 99.7 wt.-%, still more preferably of at least 99.8 wt.-%, of propylene units. In a preferred embodiment only propylene units in the propylene homopolymer are detectable. The comonomer content can be determined with $^{13}$C NMR spectroscopy, as described below in the examples.

In case the crystalline polypropylene matrix (M-PP) is a random propylene copolymer (R-PP) it is appreciated that the random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The term "random" indicates that the comonomers of the random propylene copolymers as defined in the instant invention are randomly distributed within the propylene copolymers. The term random is understood according to IUPAC (Glossary of basic terms in polymer science; IUPAC recommendations 1996).

Accordingly in a preferred embodiment the crystalline polypropylene matrix (M-PP) is a random propylene copolymer (R-PP) with a comonomer content in the range of more than 0.3 to equal or less than 4.0 wt.-%, more preferably in the range of more than 0.3 to equal or less than 2.0 wt.-%.

Even more preferred the crystalline polypropylene matrix (M-PP) comprises as polymer components at least two polypropylene fractions (PP1) and (PP2), more preferably comprises as polymer components two polypropylene fractions (PP1) and (PP2), yet more preferably comprises as polymer components two polypropylene fractions (PP1) and (PP2) only.

The two polypropylene fractions (PP1) and (PP2) may differ in the melt flow rate MFR$_2$ (230° C.) and/or in the comonomer content and/or comonomer type. Preferably the two polypropylene fractions (PP1) and (PP2) differ in the melt flow rate MFR$_2$ (230° C.) and/or in the comonomer content.

Accordingly the first polypropylene fraction (PP1) and the second polypropylene fraction (PP2) can be a propylene homopolymer or a random propylene copolymer. Thus the polypropylene matrix (M-PP) comprises, preferably comprises at least to 90 wt.-%, more preferably comprises at least to 98 wt.-%, like consists of, (a) a first polypropylene fraction (PP1) being a first propylene homopolymer (H-PP1) or a first random propylene copolymer (R-PP1), preferably a first propylene homopolymer (H-PP1), and (b) a second polypropylene fraction (PP2) being a second propylene homopolymer (H-PP2) or a second random propylene copolymer (R-PP2), preferably a second random propylene copolymer (R-PP2).

Preferably the weight ratio [(PP1)/(PP2)] between the first polypropylene fraction (PP1) and the second polypropylene fraction (PP2) is 70/30 to 30/70, more preferably 60/40 to 40/60.

As stated above the first polypropylene fraction (PP1) is a first random propylene copolymer fraction (R-PP1) or a first propylene homopolymer fraction (H-PP1), the latter being preferred.

The xylene cold soluble (XCS) content measured according to ISO 6427 (23° C.) of the first polypropylene fraction (PP1) is preferably equal or below 3.0 wt.-%, more preferably equal or below 2.5 wt.-%, still more preferably in the range of 0.5 to 3.0 wt.-%, like in the range of 0.5 to 2.0 wt.-%.

Preferably the first polypropylene fraction (PP1) has a melt flow rate MFR$_2$ (230° C.) measured according to ISO 1133 of equal or more than 30 g/10 min, more preferably of equal or more than 40 g/10 min, yet more preferably in the range of 30 to 150 g/10 min, still more preferably of 40 to 120 g/10 min, yet still more preferably in the range of 50 to 100 g/10 min. In one embodiment the melt flow rate MFR$_2$ (230° C.) of the first polypropylene fraction (PP1) is higher than the melt flow rate MFR$_2$ (230° C.) of the second polypropylene fraction (PP2).

Alternatively or additionally the first polypropylene fraction (PP1) has a weight average molecular weight (Mw) measured by gel permeation chromatography (GPC; ISO 16014-4:2003) of equal or less than 280 kg/mol, more preferably of equal or less than 250 kg/mol, yet more preferably in the range of 120 to 280 kg/mol, still more preferably in the range of 150 to 250 kg/mol.

In case the first polypropylene fraction (PP1) is a first random propylene copolymer (R-PP1) it is appreciated that the first random propylene copolymer (R-PP1) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the first random propylene copolymer (R-PP1) according to this invention comprises, especially consists of, monomers copolymerizable with propylene from the group consisting of ethylene, 1-butene and 1-hexene. More specifically the first random propylene copolymer (R-PP1) of this invention comprises—apart from propylene—units derivable from ethylene and/or 1-butene. In a preferred embodiment the first random propylene copolymer (R-PP1) comprises units derivable from ethylene and propylene only.

In one embodiment the first polypropylene fraction (PP1) is a first random propylene copolymer (R-PP1) with a comonomer content in the range of more than 0.3 to equal or less than 5.0 wt.-%, more preferably in the range of more than 0.3 to equal or less than 3.5 wt.-%. However as indicated above in a preferred embodiment the first polypropylene fraction (PP1) is a first propylene homopolymer (H-PP1).

As stated above the second polypropylene fraction (PP2) is a second propylene homopolymer fraction (H-PP2) or a second random propylene copolymer fraction (R-PP2), the latter being preferred.

The xylene cold soluble (XCS) content measured according to ISO 6427 (23° C.) of the second polypropylene fraction (PP2) is preferably equal or below 5.0 wt.-%, more preferably equal or below 4.0 wt.-%, still more preferably in the range of 0.5 to 4.5 wt.-%, like in the range of 1.5 to 4.0 wt.-%. In one embodiment the xylene cold soluble (XCS) content measured according to ISO 6427 (23° C.) of the second polypropylene fraction (PP2) is higher than the xylene cold soluble (XCS) content measured according to ISO 6427 (23° C.) of the first polypropylene fraction (PP1).

Preferably the second polypropylene fraction (PP2) has a melt flow rate $MFR_2$ (230° C.) measured according to ISO 1133 of more than 30 g/10 min, more preferably of equal or more than 35 g/10 min, yet more preferably in the range of 30 to 100 g/10 min, still more preferably of 35 to 80 g/10 min, yet still more preferably in the range of 40 to 75 g/10 min.

In case the second polypropylene fraction (PP2) is a second random propylene copolymer (R-PP2) it is appreciated that the second random propylene copolymer (R-PP2) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the second random propylene copolymer (R-PP2) according to this invention comprises, especially consists of, monomers copolymerizable with propylene from the group consisting of ethylene, 1-butene and 1-hexene. More specifically the second random propylene copolymer (R-PP2) of this invention comprises—apart from propylene—units derivable from ethylene and/or 1-butene. In a preferred embodiment the second random propylene copolymer (R-PP2) comprises units derivable from ethylene and propylene only.

Accordingly in a preferred embodiment the second polypropylene fraction (PP2) is a second random propylene copolymer (R-PP2) with a comonomer content in the range of more than 0.3 to equal or less than 5.0 wt.-%, more preferably in the range of more than 0.3 to equal or less than 3.5 wt.-%.

One further essential component of the heterophasic propylene copolymer (HECO) is its elastomeric copolymer phase (E).

The elastomeric propylene copolymer phase (E) preferably comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer phase (E) comprises, especially consists of, monomers copolymerizable with propylene from the group consisting of ethylene, 1-butene and 1-hexene. More specifically the elastomeric propylene copolymer phase (E) comprises—apart from propylene—units derivable from ethylene and/or 1-butene. Thus in an especially preferred embodiment the elastomeric propylene copolymer phase (E) comprises units derivable from ethylene and propylene only.

The properties of the elastomeric propylene copolymer phase (E) mainly influences the xylene cold soluble (XCS) content as well as the amorphous phase (AM) of the final heterophasic propylene copolymer (HECO). Thus according to the present invention the amorphous phase (AM) of the xylene cold soluble (XCS) fraction of the heterophasic propylene copolymer (HECO) is regarded as the elastomeric propylene copolymer phase (E) of the heterophasic propylene copolymer (HECO).

The amount of the elastomeric propylene copolymer phase (E), i.e. the amorphous phase (AM) of the xylene cold soluble (XCS) fraction of the heterophasic propylene copolymer (HECO), within the heterophasic propylene copolymer (HECO) is 10 to 30 wt.-%, more preferably 15 to 25 wt.-%.

Accordingly one important requirement of the present invention is that the elastomeric propylene copolymer phase (E) has a rather low weight average molecular weight. Low intrinsic viscosity (IV) values reflect a low weight average molecular weight. Thus it is appreciated that the elastomeric propylene copolymer phase (E), i.e. the amorphous phase (AM) of the xylene cold soluble fraction (XCS) of the heterophasic propylene copolymer (HECO), has an intrinsic viscosity (IV) measured according to ISO 1628-1 (at 135° C. in decalin) of equal or less than 2.5 dl/g, more preferably of 0.9 to equal or less than 2.5 dl/g, still more preferably in the range of 0.7 to 2.0 dl/g.

The comonomer content, preferably the ethylene content, within the elastomeric propylene copolymer phase (E) is comparatively moderate to high. Accordingly in a preferred embodiment the comonomer content, more preferably ethylene content, of the elastomeric propylene copolymer (E), i.e. the amorphous phase (AM) of the xylene cold soluble fraction (XCS) of the heterophasic propylene copolymer (HECO), is equal or more than 35 wt.-%, more preferably in the range of 35 to 70 wt.-%, still more preferably between 40 to 60 wt.-%, yet more preferably in the range of 40.0 to 55.0 wt.-%.

It is especially preferred that the elastomeric propylene copolymer phase (E) comprises, preferably consist of, a first elastomeric copolymer (E1) and a second elastomeric copolymer (E2), the first elastomeric copolymer (E1) and the second elastomeric copolymer (E2) differ in their intrinsic viscosity measured according to ISO 1628-1 (at 135° C. in decalin) and/or their comonomer-content.

Preferably the weight ratio [(E1)/(E2)] between the first elastomeric copolymer (E1) and the second elastomeric copolymer (E2) is 80/20 to 20/80, more preferably 70/30 to 30/70.

As explained in detail below, the heterophasic propylene copolymer (HECO) is produced in a sequential polymerization process comprising at least three reactors, preferably four reactors, connected in series. Accordingly in case of a four reactor system in the first and second reactor the crystalline polypropylene matrix (M-PP), i.e. the first polypropylene (PP1) and second polypropylene (PP2), is/are produced, whereas in the third and fourth reactors the elastomeric propylene copolymer phase (E), i.e. the first elastomeric copolymer (E1) and the second elastomeric copolymer (E2), is/are obtained. Thus the intrinsic viscosity (IV) as well as the comonomer content of the elastomeric copolymer ((E1) or (E2)) produced in the last reactor is calculated from the amorphous phase after the fourth reactor, taking into account the properties after the third one. The exact method is given in the example section.

The first elastomeric copolymer (E1) preferably comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the first elastomeric copolymer (E1) comprises, especially consists of, monomers copolymerizable with propylene from the group consisting of ethylene, 1-butene and 1-hexene. More specifically the first elastomeric copolymer (E1) comprises—apart from propylene—units derivable from ethylene and/or 1-butene. Thus in an especially preferred embodiment the first elastomeric copolymer (E1) comprises units derivable from ethylene and propylene only.

The comonomer content, preferably the ethylene content, within the first elastomeric copolymer (E1) is comparatively high. Accordingly in a preferred embodiment the comonomer content, more preferably ethylene content, of the first elastomeric copolymer (E1) is equal or more than 40, more preferably in the range of 40 to 75 wt.-%, still more preferably between 50 to 70 wt.-%. Accordingly the propylene content of the first elastomeric copolymer (E1) is less than 60 wt.-%, more preferably in the range of 25 to 60 wt.-%, still more preferably between 30 to 50 wt.-%.

Moreover the intrinsic viscosity (IV) of the first elastomeric copolymer (E1) is in the range of 0.5 to 2.5 dl/g, more preferably in the range of 0.7 to 2.0 dl/g.

Like in the first elastomeric copolymer (E1), the second elastomeric copolymer (E2) preferably comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the second elastomeric copolymer (E2) comprises, especially consists of, monomers copolymerizable with propylene from the group consisting of ethylene, 1-butene and 1-hexene. More specifically the second elastomeric copolymer (E2) comprises—apart from propylene—units derivable from ethylene and/or 1-butene. Thus in an especially preferred embodiment the second elastomeric copolymer (E2) comprises units derivable from ethylene and propylene only.

It is in particular preferred that the first elastomeric copolymer (E1) and second elastomeric copolymer (E2) have the same comonomer.

The comonomer content, preferably the ethylene content, within the second elastomeric copolymer (E2) is preferably in the range of 15 to 50 wt.-%, more preferably between 20 to 40 wt.-%. Accordingly the propylene content of the second elastomeric copolymer (E2) preferably in the range of 50 to 85 wt.-%, more preferably in the range of 60 to 80 wt.-%.

Preferably the comonomer content, preferably the ethylene content, of the second elastomeric copolymer (E2) is lower compared to the comonomer content, preferably the ethylene content, of the first elastomeric copolymer (E1).

Moreover the intrinsic viscosity (IV) of the second elastomeric copolymer (E2) is in the range of 1.0 to 3.0 dl/g, more preferably in the range of 1.0 to 2.5 dl/g. Preferably the intrinsic viscosity (IV) of the second elastomeric copolymer (E2) is higher compared to the intrinsic viscosity (IV) of the first elastomeric copolymer (E1).

In addition to the heterophasic propylene copolymer (HECO) the instant invention must comprise two different polyethylenes, i.e. a first polyethylene (PE1) and a second polyethylene (PE2), wherein the second polyethylene (PE2) has a higher density than the first polyethylene (PE1).

Accordingly the first polyethylene (PE1) has a density measured according to ISO 1183-187 in the range of 905 to 925 kg/m³, more preferably in the range of 910 to 920 kg/m³. Thus it is appreciated that the first polyethylene is a low density polyethylene (LDPE).

A further characteristic feature of the first polyethylene (PE1) is its melt flow rate. Accordingly it is appreciated that the first polyethylene (PE1) has a melt flow rate $MFR_2$ (190° C.) of below 30 g/10 min, more preferably in the range of 8 to 30 g/10 min, yet more preferably in the range of 10 to 20 g/10 min.

The first polyethylene (PE1) preferably is characterized by a rather broad molecular weight distribution. Thus it is preferred that the molecular weight distribution (MWD) of the first polyethylene (PE1) determined by gel permeation chromatography (GPC) is of at least 10, more preferably of at least 20, yet more preferably in the range of 10 to 45, still yet more preferably in the range of 20 to 40.

The weight average molecular weight (Mw) of the first polyethylene (PE1) is preferably equal or above 100 kg/mol, more preferably in the range of 100 to 1000 kg/mol, yet more preferably in the range of 300 to 800 kg/mol.

Additionally it is appreciated that the first polyethylene (PE1) has a melting temperature of equal or below 120, more preferably in the range of 90 to 115° C.

In a preferred embodiment the first polyethylene (PE1), i.e. the low density polyethylene (LDPE), is an ethylene copolymer or an ethylene homopolymer, the latter being preferred. Accordingly the ethylene content in the first polyethylene (PE1) is at least 80 wt.-%, more preferably at least 90 wt.-%.

The expression ethylene homopolymer used in the instant invention relates to a polyethylene that consists substantially, i.e. of more than 99.7 wt.-%, still more preferably of at least 99.8 wt.-%, of ethylene units. In a preferred embodiment only ethylene units in the ethylene homopolymer are detectable. The comonomer content can be determined with $^{13}C$ NMR spectroscopy, as described below in the examples.

In case the first polyethylene (PE1), i.e. the low density polyethylene (LDPE), is an ethylene copolymer it is preferred that it contains as a major part units derivable from ethylene. Accordingly it is appreciated that the first polyethylene (PE1) being an ethylene copolymer comprises at least 80 wt.-% units derivable from ethylene, more preferably at least 90 wt.-% of units derived from ethylene. Thus it is appreciated that the first polyethylene (PE1) being an ethylene copolymer comprises 80 to 99.5 wt.-%, more preferably 90 to 99 wt.-%, units derivable from ethylene. The comonomers present in such a first polyethylene (PE1) are $C_4$ to $C_{20}$ α-olefins, like 1-butene, 1-hexene and 1-octene, the latter especially preferred, or dienes, preferably non-conjugated α,ω-alkadienes, i.e. $C_5$ to $C_{20}$ α,ω-alkadienes, like 1,7-octadiene. Accordingly in one specific embodiment the first polyethylene (PE1) being an ethylene copolymer is an ethylene-1,7-octadiene polymer with the amounts given in this paragraph.

The second polyethylene (PE2) has a density measured according to ISO 1183-187 above 915 kg/m³, more preferably in the range of above 915 to 938 kg/m³, yet more preferably in the range of 920 to 935 kg/m³. Thus it is appreciated that the first polyethylene is a low density polyethylene (LDPE).

A further characteristic feature of the second polyethylene (PE2) is its melt flow rate. Accordingly it is appreciated that the second polyethylene (PE2) has a melt flow rate $MFR_2$ (190° C.) of equal or above 30 g/10 min, more preferably in the range of 30 to 500 g/10 min, yet more preferably in the range of 90 to 300 g/10 min.

The second polyethylene (PE2) preferably is characterized by a rather narrow molecular weight distribution. Thus it is preferred that the molecular weight distribution (MWD) of the second polyethylene (PE2) determined by gel permeation chromatography (GPC) is of below 10, more preferably in the range of 0.5 to 10, yet more preferably in the range of 1 to 8, still yet more preferably in the range of 1.5 to 6.

The weight average molecular weight (Mw) of the second polyethylene (PE2) is preferably below 100 kg/mol, more preferably in the range of 10 to 100 kg/mol, yet more preferably in the range of 20 to 60 kg/mol.

In a preferred embodiment the second polyethylene (PE2) is an ethylene homopolymer or an ethylene copolymer, the latter being preferred Accordingly the ethylene content in the second polyethylene (PE2) is at least 80 wt.-%, more preferably at least 85 wt.-%.

In case the second polyethylene (PE2) is an ethylene copolymer it is preferred that it contains as a major part units derivable from ethylene. Accordingly it is appreciated that the second polyethylene (PE2) being an ethylene copolymer comprises at least 80 wt.-% units derivable from ethylene, more preferably at least 85 wt.-% of units derived from ethylene. Thus it is appreciated that the second polyethylene (PE2) being an ethylene copolymer comprises 80 to 97 wt.-%, more preferably 85 to 95 wt.-%, units derivable from ethylene. The comonomers present in such a second polyethylene (PE2) are $C_4$ to $C_{20}$ α-olefins, like 1-butene, 1-hexene and 1-octene, the latter especially preferred. Accordingly in one specific embodiment the second polyethylene (PE2) being an ethylene copolymer is an ethylene-1-octene polymer with the amounts given in this paragraph Finally the instant polypropylene composition preferably comprises an α-nucleating agent (NA).

In principle any α-nucleating agent (NA) can be used. However it is preferred that the α-nucleating agent (NA) is selected from the group consisting of
(a) salts of monocarboxylic acids and polycarboxylic acids, e.g. sodium benzoate or aluminum tert-butylbenzoate,
(b) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 bis(dimethylbenzylidene)sorbitol),
(c) substituted nonitol-derivatives, such as 1,2,3,-trideoxy-4,6:5,7-bis-O-[(4-propylphenyl)methylene]-nonitol,
(d) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], like aluminium-hydroxy-bis[2,2'-methylene-bis(4,6-di-tert-butylphenyl)phosphate] and Li-myristate (NA21),
(e) trisamide-benze derivatives, i.e. N-[3,5-bis-(2,2-dimethyl-propionylamino)-phenyl]-2,2-dimethyl-propionamide.

Especially good results are obtainable in case the instant polypropylene composition comprises
(a1) 55 to 80 wt.-%, preferably 60 to 75, of the crystalline polypropylene matrix (M-PP)
(b1) 7.5 to 30 wt.-%, preferably 10 to 25, of the elastomeric propylene copolymer phase (E),
(c1) 2.5 to 15 wt.-%, preferably 5 to 10, of the first polyethylene (PE1),
(d1) 2.5 to 15 wt.-%, preferably 5 to 10, of the second polyethylene (PE2), and
(e1) 0.0005 to 1.0 wt.-%, preferably 0.1 to 0.5, of the α-nucleating agent (NA), or
(a2) 55 to 80 wt.-%, preferably 60 to 75, of the crystalline polypropylene matrix (M-PP)
(b2) 2.5 to 20 wt.-%, preferably 5 to 15, of the first elastomeric propylene copolymer (E1),
(c2) 2.5 to 20 wt.-%, preferably 2.5 to 10, of the second elastomeric propylene copolymer (E2),
(d2) 2.5 to 15 wt.-%, preferably 5 to 10, of the first polyethylene (PE1),
(e2) 2.5 to 15 wt.-%, preferably 5 to 10, of the second polyethylene (PE2), and
(f2) 0.0005 to 1.0 wt.-%, preferably 0.1 to 0.5, of the α-nucleating agent (NA).
or
(a3) 15 to 45 wt.-%, preferably 25 to 45, of a first polypropylene fraction (PP1) being part of the crystalline polypropylene matrix (M-PP),
(b3) 15 to 55 wt.-% of, preferably 25 to 45, a second polypropylene fraction (PP2) being part of the crystalline polypropylene matrix (M-PP)
(c3) 2.5 to 20 wt.-%, preferably 5 to 15, of the first elastomeric propylene copolymer (E1),
(d3) 2.5 to 20 wt.-%, preferably 2.5 to 10, of the second elastomeric propylene copolymer (E2),
(e3) 2.5 to 15 wt.-%, preferably 5 to 10, of the first polyethylene (PE1),
(f3) 2.5 to 15 wt.-%, preferably 5 to 10, of the second polyethylene (PE2), and
(g3) 0.0005 to 1.0 wt.-%, preferably 0.1 to 0.5, of the α-nucleating agent (NA).

The instant invention is also directed to the use of the inventive polypropylene composition for packaging material.

Furthermore, the present invention relates to packaging material, like injection-moulded packaging containers like thin-walled injection mouldings, houseware articles and transport packaging, comprising, preferably comprising at least 75 wt.-%, more preferably comprising at least 90 wt.-%, like at least 95 wt.-%, most preferably consists of, a polypropylene composition as defined in the instant invention.

Further the invention defines a process for the preparation of the polypropylene composition according to this invention. The process comprises the steps of mixing up a composition comprising the polypropylene matrix (M-PP) and the elastomeric propylene copolymer phase (E) (i.e. the heterophasic propylene copolymer (HECO)), the first polyethylene (PE1), the second polyethylene (PE2), and optionally the α-nucleating agent (NA) in an extruder.

All components used for the preparation of the instant composition are known. Accordingly also their preparation is well known.

For instance the heterophasic polypropylenes (HECO) according to this invention is preferably produced in a multistage process known in the art, wherein the polypropylene matrix (M-PP) is produced at least in one slurry reactor and subsequently the elastomeric propylene copolymer phase (E) is produced at least in one gas phase reactor.

The heterophasic propylene copolymer (HECO) as defined above is in particular produced by a sequential polymerization process as defined below.

Accordingly the present invention is directed to a sequential polymerization process for producing a heterophasic propylene copolymer (HECO) according to the instant invention, said heterophasic propylene copolymer (HECO) comprises a first polypropylene fraction (PP1), a second polypropylene fraction (PP2), a first elastomeric copolymer (E1) and a second elastomeric copolymer (E2), wherein said process comprises the steps of
(a) polymerizing propylene and optionally at least one ethylene and/or $C_4$ to $C_{12}$ α-olefin in a first reactor (R1) obtaining the first polypropylene fraction (PP1), preferably said first polypropylene fraction (PP1) is a first propylene homopolymer (H-PP1), (b) transferring the first polypropylene fraction (PP1) into a second reactor (R2), (c) polymerizing in the second reactor (R2) and in the presence of said first polypropylene fraction (PP1) propylene and optionally at least one ethylene and/or $C_4$ to $C_{12}$ α-olefin obtaining thereby the second polypropylene fraction (PP2), preferably said second polypropylene fraction (PP2) is a second random propylene copolymer (R-PP2), said first polypropylene fraction (PP1) and said second polypropylene fraction (PP2) form the polypropylene matrix (M-PP), (d) transferring the polypropylene matrix (M-PP) of step (c1) into a third reactor (R3), (e) polymerizing in the third reactor (R3) and in the presence of the mixture obtained in step (c1) propylene and at least one ethylene and/or $C_4$ to $C_{12}$ α-olefin obtaining thereby a first elastomeric propylene copolymer (E1), preferably said first elastomeric propylene copolymer (E1) is a first elastomeric ethylene propylene copolymer, the first elastomeric propylene copolymer (E1) is dispersed in the polypropylene matrix (M-PP), (f) transferring the polypropylene matrix (M-PP) in which the first elastomeric propylene copolymer (E1) is dispersed in a fourth reactor (R4), and (g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer (E2), the polypropylene matrix (M-PP), the first elastomeric propylene copolymer (E1), and the second elastomeric propylene copolymer (E2) form the heterophasic propylene copolymer (HECO).

Of course, in the first reactor (R1) the second polypropylene fraction (PP2) can be produced and in the second reactor (R2) the first polypropylene fraction is obtained (PP1). The same holds true for the elastomeric propylene copolymer phase (E). Accordingly in the third reactor (R3) the second elastomeric propylene copolymer (E2) is produced whereas in the fourth reactor (R4) the first elastomeric propylene copolymer (E1) is made.

Preferably between the second reactor (R2) and the third reactor (R3) and optionally between the third reactor (R3) and fourth reactor (R4) the monomers are flashed out.

For preferred embodiments of the heterophasic propylene copolymer (HECO), the polypropylene matrix (M-PP), the first polypropylene fraction (PP1), the second polypropylene fraction (PP2), and the elastomeric propylene copolymer (E), the first elastomeric copolymer (E1), as well as for the second elastomeric copolymer (E2) reference is made to the definitions given above.

The term "sequential polymerization process" indicates that the polypropylene is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably in from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80-mol-%, more preferably 90 mol-%, most preferably 95 mol.-%, of a dialkylphthalate of formula (II)

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BCF20P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

For the production of the heterophasic propylene copolymer (HECO) according to the invention the catalyst system used preferably comprises in addition to the special Ziegler-Nana procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \quad \text{(IIIa)}$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert-butyl, tert-amyl, neopentyl, cyclopentyl, cyclohexyl, methylcyclopentyl and cycloheptyl.

Formula (IIIb) is defined by $$Si(OCH_2CH_3)_3(NR^xR^y) \quad \text{(IIIb)}$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (IIIb) is diethylaminotriethoxysilane.

Most preferably the external donor is of formula (IIIa), like dicyclopentyl dimethoxy silane $[Si(OCH_3)_2(cyclopentyl)_2]$ or diisopropyl dimethoxy silane $[Si(OCH_3)_2(CH(CH_3)_2)_2]$.

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The additives as stated above are added afterwards to the heterophasic propylene copolymer (HECO), which is collected from the final reactor of the series of reactors. Preferably, these additives are mixed into the composition prior to or during the extrusion process in a one-step compounding process. Alternatively, a master batch may be formulated, wherein the heterophasic propylene copolymer (HECO) is first mixed with only some of the additives.

For mixing, a conventional compounding or blending apparatus, e.g. a Banbury mixer, a t-roll rubber mill, Buss-co-kneader or a twin screw extruder may be used. The polymer materials recovered from the extruder are usually in the form of pellets. These pellets are then preferably further processed with the first and second polyethylene (PE1) and (PE2), e.g. by injection molding to generate articles, like packing material, of the inventive polypropylene composition.

In the following the present invention is further illustrated by means of examples.

EXAMPLES

A. Measuring Methods

The following definitions of terms and determination methods apply for the above general description of the invention as well as to the below examples unless otherwise defined.

Calculation of comonomer content of the second polypropylene fraction (PP2):

$$\frac{C(R2) - w(PP1) \times C(PP1)}{w(PP2)} = C(PP2)$$

wherein w(PP1) is the weight fraction of the first polypropylene fraction (PP1), i.e. the product of the first reactor (R1), w(PP2) is the weight fraction of the second polypropylene fraction (PP2), i.e. of the polymer produced in the second reactor (R2), C(PP1) is the comonomer content [in wt.-%] measured by $^{13}$C NMR spectroscopy of the first polypropylene fraction (PP1), i.e. of the product of the first reactor (R1), C(R2) is the comonomer content [in wt.-%] measured by $^{13}$C NMR spectroscopy of the product obtained in the second reactor (R2), i.e. the mixture of the first polypropylene fraction (PP1) and the second polypropylene fraction (PP2), C(PP2) is the calculated comonomer content [in wt.-%] of the second polypropylene (PP2).

Calculation of the xylene cold soluble (XCS) content of the second polypropylene fraction (PP2):

$$\frac{XS(R2) - w(PP1) \times XS(PP1)}{w(PP2)} = XS(PP2)$$

wherein w(PP1) is the weight fraction of the first polypropylene fraction (PP1), i.e. the product of the first reactor (R1), w(PP2) is the weight fraction of the second polypropylene fraction (PP2), i.e. of the polymer produced in the second reactor (R2), XS(PP1) is the xylene cold soluble (XCS) content [in wt.-%] as determined at 23° C. according to ISO 6427 of the first polypropylene fraction (PP1), i.e. of the product of the first reactor (R1), XS(R2) is the xylene cold soluble (XCS) content [in wt.-%] as determined at 23° C. according to ISO 6427 of the product obtained in the second reactor (R2), i.e. the mixture of the first polypropylene fraction (PP1) and the second polypropylene fraction (PP2), XS(PP2) is the calculated xylene cold soluble (XCS) content [in wt.-%] of the second polypropylene fraction (PP2).

Calculation of melt flow rate MFR$_2$ (230° C.) of the second polypropylene fraction (PP2):

$$MFR(PP2) = 10^{\left[\frac{log(MFR(R2)) - w(PP1) \times log(MFR(PP1))}{w(PP2)}\right]}$$

wherein w(PP1) is the weight fraction of the first polypropylene fraction (PP1), i.e. the product of the first reactor (R1), w(PP2) is the weight fraction of the second polypropylene fraction (PP2), i.e. of the polymer produced in the second reactor (R2), MFR(PP1) is the melt flow rate MFR$_2$ (230° C.) [in g/10 min] measured according ISO 1133 of the first polypropylene fraction (PP1), i.e. of the product of the first reactor (R1), MFR(R2) is the melt flow rate MFR$_2$ (230° C.) [in g/10 min] measured according ISO 1133 of the product obtained in the second reactor (R2), i.e. the mixture of the first polypropylene fraction (PP1) and the second polypropylene fraction (PP2), MFR(PP2) is the calculated melt flow rate MFR$_2$ (230° C.) [in g/10 min] of the second polypropylene fraction (PP2).

Calculation of intrinsic viscosity (IV) of the second elastomeric propylene copolymer (E2):

$$IV(E2) = 10^{\frac{log(IV(HECO)) - w(E1) \times log(IV(E1))}{w(E2)}}$$

wherein w(E1) is the weight fraction of the first elastomeric propylene copolymer (E1), i.e. the weight fraction of the amorphous fraction of the xylene cold soluble (XCS) fraction of the product in the third reactor (R3), w(E2) is the weight fraction of the amorphous part (AM) of the xylene cold soluble (XCS) fraction of the product produced in the fourth reactor (R4), i.e. of the second elastomeric propylene copolymer (E2), IV(HECO) is the intrinsic viscosity (IV) [in dl/g] of the amorphous part (AM) of the xylene cold soluble (XCS) fraction of the heterophasic propylene copolymer (HECO), IV(E1) is the intrinsic viscosity (IV) [in dl/g] of the amorphous part (AM) of the xylene cold soluble (XCS) fraction of the product of the third reactor (R3), i.e. the intrinsic viscosity (IV) [in dl/g] of the first elastomeric propylene copolymer (E1), IV(E2) is the calculated intrinsic viscosity (IV) [in dl/g] of the amorphous part (AM) of the xylene cold soluble (XCS) fraction produced in the fourth reactor (R4), i.e. is the calculated intrinsic viscosity (IV) [in dl/g] of the second elastomeric propylene copolymer (E2).

Calculation of comonomer content of the second elastomeric propylene copolymer (E2):

$$CC(E2) = \frac{CC(HECO) - w(E1) \times CC(E1)}{w(E2)}$$

wherein w(E1) is the weight fraction of the first elastomeric propylene copolymer (E1), i.e. the weight fraction of the amorphous fraction of the xylene cold soluble (XCS) fraction of the product in the third reactor (R3), w(E2) is the weight fraction of the amorphous part (AM) of the xylene cold soluble (XCS) fraction of the product produced in the fourth reactor (R4), i.e. of the second elastomeric propylene copolymer (E2), CC(HECO) is the comonomer content [in wt.-%] of the amorphous part (AM) of the xylene cold soluble (XCS) fraction of the heterophasic propylene copolymer (HECO), CC(E1) is the comonomer content [in wt.-%] of the amorphous part (AM) of the xylene cold soluble (XCS) fraction of the product of the third reactor (R3), i.e. the comonomer content [in wt.-%] of the first elastomeric propylene copolymer (E1), CC(E2) is the calculated comonomer content [in wt.-%] of the amorphous part (AM) of the xylene cold soluble (XCS) fraction produced in the fourth reactor (R4), i.e. is the calculated comonomer content [in wt.-%] of the second elastomeric propylene copolymer (E2).

Quantification of Microstructure by NMR Spectroscopy

Quantitative nuclear-magnetic resonance (NMR) spectroscopy was used to quantify the isotacticity, regio-regularity and comonomer content of the polymers.

Quantitative $^{13}$C{$^{1}$H} NMR spectra were recorded in the solution-state using a Bruker Advance III 400 NMR spectrometer operating at 400.15 and 100.62 MHz for $^{1}$H and $^{13}$C respectively. All spectra were recorded using a $^{13}$C optimised 10 mm extended temperature probehead at 125° C. using nitrogen gas for all pneumatics.

For polypropylene homopolymers approximately 200 mg of material was dissolved in 1,2-tetrachloroethane-d$_2$ (TCE-d$_2$). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution needed for tacticity distribution quantification (Busico, V., Cipullo, R., Prog. Polym. Sci. 26 (2001) 443; Busico, V.; Cipullo, R., Monaco, G., Vacatello, M., Segre, A. L., Macromoleucles 30 (1997) 6251). Standard single-pulse excitation was employed utilising the NOE and bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra For ethylene-propylene copolymers approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28.5 (2009), 475). To ensure a homogeneous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ 16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 6144 (6k) transients were acquired per spectra.

Quantitative $^{13}C\{^1H\}$ NMR spectra were processed, integrated and relevant quantitative properties determined from the integrals using proprietary computer programs.

For ethylene-propylene copolymers all chemical shifts were indirectly referenced to the central methylene group of the ethylene block (EEE) at 30.00 ppm using the chemical shift of the solvent. This approach allowed comparable referencing even when this structural unit was not present.

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

$$[mmmm]\% = 100*(mmmm/\text{sum of all pentads})$$

The presence of 2.1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2.1 erythro regio defects was quantified using the average integral of the two characteristic methyl sites at 17.7 and 17.2 ppm:

$$P_{21e} = (I_{e6} + I_{e8})/2$$

The amount of 1.2 primary inserted propene was quantified based on the methyl region with correction undertaken for sites included in this region not related to primary insertion and for primary insertion sites excluded from this region:

$$P_{12} = I_{CH3} + P_{12e}$$

The total amount of propene was quantified as the sum of primary inserted propene and all other present regio defects:

$$P_{total} = P_{12} + P_{21e}$$

The mole percent of 2.1 erythro regio defects was quantified with respect to all propene:

$$[21e]\text{mol }\% = 100*(P_{21e}/P_{total})$$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The mole fraction of ethylene in the polymer was quantified using the method of Wang et. al. (Wang, W-J., Zhu, S., Macromolecules 33 (2000), 1157) through integration of multiple signals across the whole spectral region of a $^{13}C\{^1H\}$ spectra acquired using defined conditions. This method was chosen for its accuracy, robust nature and ability to account for the presence of regio-defects when needed. Integral regions were slightly adjusted to increase applicability to a wider range of comonomer contents.

The mole percent comonomer incorporation in the polymer was calculated from the mole fraction according to:

$$E[\text{mol }\%] = 100*fE$$

The weight percent comonomer incorporation in the polymer was calculated from the mole fraction according to:

$$E[\text{wt }\%] = 100*(fE*28.05)/((fE*28.05) + ((1+fE)*42.08))$$

The comonomer sequence distribution at the triad level was determined using the method of Kakugo et al. (Kakugo, M., Naito, Y., Mizunuma, K., Miyatake, T. Macromolecules 15 (1982) 1150) through integration of multiple signals across the whole spectral region of a $^{13}C\{^1H\}$ spectra acquired using defined conditions. This method was chosen for its robust nature. Integral regions were slightly adjusted to increase applicability to a wider range of comonomer contents.

The mole percent of a given comonomer triad sequence in the polymer was calculated from the mole fraction determined by the method of Kakugo et at. (Kakugo, M., Naito, Y., Mizunuma, K., Miyatake, T. Macromolecules 15 (1982) 1150) according to:

$$XXX[\text{mol }\%] = 100*fXXX$$

The mole fraction comonomer incorporation in the polymer, as determined from the comonomer sequence distribution at the triad level, were calculated from the triad distribution using known necessary relationships (Randall, J. Macromol. Sci., Rev. Macromol. Chem. Phys. 1989, C29, 201):

$$fXEX=fEEE+fPEE+fPEP$$

$$fXPX=fPPP+fEPP+fEPE$$

where PEE and EPP represents the sum of the reversible sequences PEE/EEP and EPP/PPE respectively.

The randomness of the comonomer distribution was quantified as the relative amount of isolated ethylene sequences as compared to all incorporated ethylene. The randomness was calculated from the triad sequence distribution using the relationship:

$$R(E)[\%]=100*(fPEP/fXEX)$$

Number average molecular weight ($M_e$), weight average molecular weight ($M_n$) and molecular weight distribution (MWD) are determined by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Density is measured according to ISO 1183-187. Sample preparation is done by compression moulding in accordance with ISO 1872-2:2007.

MFR$_2$ (230° C.) is measured according to ISO 1133 (230° C., 2.16 kg load).

MFR$_2$ (190° C.) is measured according to ISO 1133 (190° C., 2.16 kg load).

Hexane Solubles

FDA section 177.1520

1 g of a polymer film of 100 μm thickness is added to 400 ml hexane at 50° C. for 2 hours while stirring with a reflux cooler.

After 2 hours the mixture is immediately filtered on a filter paper N°41.

The precipitate is collected in an aluminium recipient and the residual hexane is evaporated on a steam bath under N$_2$ flow.

Xylene Cold Soluble Fraction (XCS Wt.-%)

The xylene cold soluble fraction (XCS) is determined at 23° C. according to ISO 6427.

The amorphous content (AM) is measured by separating the above xylene cold soluble fraction (XCS) and precipitating the amorphous part with acetone. The precipitate was filtered and dried in a vacuum oven at 90° C.

$$AM \% = \frac{100 \times m1 \times v0}{m0 \times v1}$$

wherein
"AM %" is the amorphous fraction,
"m0" is initial polymer amount (g)
"m1" is weight of precipitate (g)
"v0" is initial volume (ml)
"v1" is volume of analyzed sample (ml)

Intrinsic viscosity is measured according to DIN ISO 1628/1, October 1999 (in Decalin at 135° C.).

Melting temperature ($T_m$) and heat of fusion ($H_f$), crystallization temperature ($T_c$) and heat of crystallization ($H_c$): measured with Mettler TA820 differential scanning calorimetry (DSC) on 5 to 10 mg samples. DSC is run according to ISO 3146/part 3/method C2 in a heat/cool/heat cycle with a scan rate of 10° C./min in the temperature range of +23 to +210° C. Crystallization temperature and heat of crystallization ($H_c$) are determined from the cooling step, while melting temperature and heat of fusion ($H_f$) are determined from the second heating step Tensile Modulus; Tensile strain at break are measured according to ISO 527-2 (cross head speed=1 mm/min; 23° C.) using injection molded specimens as described in EN ISO 1873-2 (dog bone shape, 4 mm thickness).

Charpy notched impact strength is determined according to ISO 179/1A at 23° C., and at −20° C. by using injection moulded test specimens as described in EN ISO 1873-2 (80×10×4 mm)

Haze and transparency were determined according to ASTM D1003 on 1.0 mm and 0.5 mm plaques, respectively
2. Examples The catalyst system was a Vinylcyclohexyl (VHC)-modified catalyst prepared according to Example 1 of WO99/24479, in combination with cocatalyst Triethylaluminium (TEA) and dicyclopentyl dimethoxy silane (donor D) as an external donor.

TABLE 1

Properties of heterophasic propylene copolymer (HECO)

| Loop | | HECO |
|---|---|---|
| Al/donor ratio | [mol/mol] | 5 |
| MFR$_2$ | [g/10 min] | 71 |
| XCS | [wt.-%] | 1.2 |
| GPR 1 | | |
| MFR$_2$ | [g/10 min] | 64 |
| XCS | [wt.-%] | 2.3 |
| C2 | [wt.-%] | 1.0 |
| GPR 2 | | |
| MFR$_2$ | [g/10 min] | 52 |
| XCS | [wt.-%] | 14.3 |
| AM | [wt.-%] | 13.2 |
| C2 of AM | [wt.-%] | 57.7 |
| Viscosity of AM | [dl/g] | 1.7 |
| C2 | [wt.-%] | 10.6 |
| C2/C3 ratio | [mol/kmol] | 1830 |
| H2/C2 ratio | [mol/kmol] | 580 |
| GPR 3 | | |
| C2 | [wt.-%] | 11.8 |
| XCS | [wt.-%] | 18.4 |
| AM | [wt.-%] | 17.2 |
| C2 of AM | [wt.-%] | 44.3 |
| Viscosity of AM | [dl/g] | 1.8 |
| MFR$_2$ | [g/10 min] | 43.3 |
| C2/C3 ratio | [mol/kmol] | 370 |

TABLE 1-continued

Properties of heterophasic propylene copolymer (HECO)

| Loop | | HECO |
|---|---|---|
| H2/C2 ratio | [mol/kmol] | 480 |
| Tm | [° C.] | 162 |
| Tc | [° C.] | 127 |

TABLE 2

Properties of PE 1 and PE 2

| | Unit | PE 2 | PE 1 |
|---|---|---|---|
| octene | [wt.-%] | 6.3 | — |
| MFR (2.16 kg/190° C) | [g/10 min] | 150 | 15 |
| Density | [g/cm$^3$] | 0.932 | 0.915 |
| Tensile modulus | [MPa] | 360 | 115 |
| NIS (23° C.) | [kJ/m$^2$] | 6.6 | — |
| NIS (−20° C.) | [kJ/m$^2$] | 3.2 | — |
| Mw | [kg/mol] | 31 | 518 |
| MWD | [—] | 3.1 | 30.7 |

PE1 is the commercial ethylene homopolymer "CA9150" of Borealis AG
PE2 is the commercial octene single-site linear low density polyethylene (sLLDPE) "SURPASS IF932-R" of NOVA Chemicals

TABLE 3

Properties of products

| Properties | | CE1 | CE2 | IE 1 | CE 3 |
|---|---|---|---|---|---|
| HECO | [wt.-%] | 84.8 | 84.8 | 84.8 | |
| NA | [wt.-%] | 0.2 | 0.2 | 0.2 | |
| PE1 | [wt.-%] | 15 | 0 | 7.5 | |
| PE2 | [wt.-%] | 0 | 15 | 7.5 | |
| MFR | [g/10 min] | 37 | 47 | 42 | 25 |
| Tensile modulus | [MPa] | 1140 | 1240 | 1215 | 1003.4 |
| Impact strength (23° C.) | [kJ/m$^2$] | 6 | 5 | 6 | 7.5 |
| Impact strength (0° C.) | [kJ/m$^2$] | 3.5 | 2.5 | 3 | 4.5 |
| Impact strength (−20° C.) | [kJ/m$^2$] | 2 | 1 | 2 | 2 |
| Transparency (1 mm) | [%] | 83 | 80 | 82 | 83 |
| Haze (1 mm) | [%] | 47 | 36 | 39 | 41 |
| Transparency (0.5 mm) | [%] | 89 | 89 | 89 | 89 |
| Haze (0.5 mm) | [%] | 20 | 12 | 15 | 19 |
| C6-Solubles | [wt.-%] | 3.6 | 4.3 | 4.3 | |

CE 3 is the commercial random heterophasic polymer "SG930MO" of Borealis having a melt flow rate MFR$_2$ (230° C.) of 25 g/10 min,
NA is the commercial phosphorous based α-nucleating agent ADK STAB NA-21 from Adeka Corporation.

We claim:

1. Polypropylene composition having a melt flow rate MFR$_2$ measured at 230° C. according to ISO 1133 of equal or above 15 g/10 min comprising
   (a) a crystalline polypropylene matrix (M-PP)
   (b) an elastomeric propylene copolymer phase (E) having
      (i) a propylene content in the range of 40 to 80 wt.-%, and
      (ii) an intrinsic viscosity (IV) measured according to ISO 1628-1 at 135° C. in decalin in the range of more than 0.7 to less or equal 2.5 dl/g,
   (c) a first polyethylene (PE1) having
      (i) a density measured according to ISO 1183-187 in the range 905 to 925 kg/m$^3$, and
      (ii) a melt flow rate MFR$_2$ measured at 190° C. according to ISO 1133 of below 30 g/10 min, and
      (iii) a molecular weight distribution (MWD) determined by gel permeation chromatography (GPC) of at least 10,
   (d) a second polyethylene (PE2) having
      (i) a density measured according to ISO 1183-187 of above 915 kg/m$^3$, and
      (ii) a melt flow rate MFR$_2$ measured at 190° C. according to ISO 1133 of equal or above 30 g/10 min, and
      (iii) a molecular weight distribution (MWD) determined by gel permeation chromatography (GPC) of below 10.

2. Polypropylene composition according to claim 1, wherein the crystalline polypropylene matrix (M-PP) has
   (a) a melt flow rate MFR$_2$ measured at 230° C. according to ISO 1133 in the range of 30 to 100 g/10 min, and/or
   (b) has a xylene cold soluble content (XCS) of equal or below 4.0 wt.-%, and/or
   (c) a melting temperature Tm determined by differential scanning calorimetry (DSC) of at least 145° C.

3. Polypropylene composition according to claim 1, wherein the crystalline polypropylene matrix (M-PP)
   (a) has a comonomer content of equal or below 4.0 wt.-%, and/or
   (b) comprises at least two different crystalline polypropylene fractions, said fractions differ in the comonomer content.

4. Polypropylene composition according to claim 3, wherein the crystalline polypropylene matrix (M-PP) comprises
   (a) at least one propylene homopolymer fraction and/or at least one random propylene copolymer fraction, and/or
   (b) one propylene homopolymer (H-PP) and one random propylene copolymer (R-PP), wherein further the weight ratio (H-PP/R-PP) between the propylene homopolymer (H-PP) and the random propylene copolymer n (R-PP) is 70/30 to 30/70.

5. Polypropylene composition according to claim 1, wherein the elastomeric propylene copolymer phase (E) comprises a first elastomeric propylene copolymer (E1) and a second elastomeric propylene copolymer (E2), the first elastomeric propylene copolymer (E1) and the second elastomeric propylene copolymer (E2) differ in their intrinsic viscosity measured according to ISO 1628-1 at 135° C. in decalin.

6. Polypropylene composition according to claim 5, wherein the weight ratio (E1/E2) between the first elastomeric propylene copolymer (E1) and the second elastomeric propylene copolymer (E2) is 80/20 to 20/80.

7. Polypropylene composition according to claim 5, wherein the first elastomeric propylene copolymer (E1) has
   (i) a propylene content in the range of 25 to 60 wt.-%, and
   (ii) an intrinsic viscosity (IV) measured according to ISO 1628-1 at 135° C. in decalin in the range 0.5 to 2.5 dl/g.

8. Polypropylene composition according to claim 5, wherein the second elastomeric propylene copolymer (E2) has
   (i) a propylene content in the range of 50 to 85 wt.-%, and
   (ii) an intrinsic viscosity (IV) measured according to ISO 1628-1 at 135° C. in decalin in the range 1.0 to below 3.0 dl/g.

9. Polypropylene composition according to claim 5, wherein the elastomeric propylene copolymer phase (E) is dispersed within the crystalline polypropylene matrix (M-PP).

10. Polypropylene composition according to claim 1, wherein the first polyethylene (PE1) has
(a) an ethylene content of at least 80 wt.-%, and/or
(b) a molecular weight distribution determined by gel permeation chromatography (GPC) of at least 10.

11. Polypropylene composition according to claim 1, wherein the second polyethylene (PE2) has
(a) an ethylene content of at least 80 wt.-%.

12. Polypropylene composition according claim 1, wherein the polypropylene composition comprises additionally an α-nucleating agent (NA).

13. Polypropylene composition according to claim 1, wherein the composition comprises
(a1) 55 to 80 wt.-% of the crystalline polypropylene matrix (M-PP)
(b1) 7.5 to 30 wt.-% of the elastomeric propylene copolymer phase (E),
(c1) 2.5 to 15 wt.-% of the first polyethylene (PE1),
(d1) 2.5 to 15 wt.-% of the second polyethylene (PE2), and
(e1) 0.0005 to 1.0 wt.-% of a α-nucleating agent (NA), or
(a2) 55 to 80 wt.-% of the crystalline polypropylene matrix (M-PP)
(b2) 2.5 to 20 wt.-% of a first elastomeric propylene copolymer (E1),
(c2) 2.5 to 20 wt.-% of a second elastomeric propylene copolymer (E2),
(d2) 2.5 to 15 wt.-% of the first polyethylene (PE1),
(e2) 2.5 to 15 wt.-% of the second polyethylene (PE2), and
(f2) 0.0005 to 1.0 wt.-% of a α-nucleating agent (NA), or
(a3) 15 to 55 wt.-% of a first crystalline polypropylene fraction being part of the crystalline polypropylene matrix (M-PP),
(b3) 15 to 55 wt.-% of a second crystalline polypropylene fraction being part of the crystalline polypropylene matrix (M-PP)
(c3) 2.5 to 20 wt.-% of a first elastomeric propylene copolymer (E1),
(d3) 2.5 to 20 wt.-% of a second elastomeric propylene copolymer (E2),
(e3) 2.5 to 15 wt.-% of the first polyethylene (PE1),
(f3) 2.5 to 15 wt.-% of the second polyethylene (PE2), and
(g3) 0.0005 to 1.0 wt.-% of a α-nucleating agent (NA).

14. Injection molded article comprising a polypropylene composition having a melt flow rate MFR$_2$ measured at 230° C. according to ISO 1133 of equal or above 15 g/10 min comprising
(a) a crystalline polypropylene matrix (M-PP)
(b) an elastomeric propylene copolymer phase (E) having
(i) a propylene content in the range of 40 to 80 wt.-%, and
(ii) an intrinsic viscosity (IV) measured according to ISO 1628-1 at 135° C. in decalin in the range of more than 0.7 to less or equal 2.5 dl/g,
(c) a first polyethylene (PE1) having
(i) a density measured according to ISO 1183-187 in the range 905 to 925 kg/m$^3$, and
(ii) a melt flow rate MFR$_2$ measured at 190° C. according to ISO 1133 of below 30 g/10 min, and
(iii) a molecular weight distribution (MWD) determined by gel permeation chromatography (GPC) of at least 10,
(d) a second polyethylene (PE2) having
(i) a density measured according to ISO 1183-187 of above 915 kg/m$^3$, and
(ii) a melt flow rate MFR$_2$ measured at 190° C. according to ISO 1133 of equal or above 30 g/10 min, and
(iii) a molecular weight distribution (MWD) determined by gel permeation chromatography (GPC) of below 10.

15. Process for the preparation of polypropylene composition having a melt flow rate MFR$_2$ measured at 230° C. according to ISO 1133 of equal or above 15 g/10 min comprising
(a) a crystalline polypropylene matrix (M-PP)
(b) an elastomeric propylene copolymer phase (E) having
(i) a propylene content in the range of 40 to 80 wt.-%, and
(ii) an intrinsic viscosity (IV) measured according to ISO 1628-1 at 135° C. in decalin in the range of more than 0.7 to less or equal 2.5 dl/g,
(c) a first polyethylene (PE1) having
(i) a density measured according to ISO 1183-187 in the range 905 to 925 kg/m$^3$, and
(ii) a melt flow rate MFR$_2$ measured at 190° C. according to ISO 1133 of below 30 g/10 min, and
(iii) a molecular weight distribution (MWD) determined by gel permeation chromatography (GPC) of at least 10,
(d) a second polyethylene (PE2) having
(i) a density measured according to ISO 1183-187 of above 915 kg/m$^3$, and
(ii) a melt flow rate MFR$_2$ measured at 190° C. according to ISO 1133 of equal or above 30 g/10 min, and
(iii) a molecular weight distribution (MWD) determined by gel permeation chromatography (GPC) of below 10;
comprising the steps of mixing up a composition comprising the polypropylene matrix (M-PP) and the elastomeric propylene copolymer phase (E), the first polyethylene (PE1), the second polyethylene (PE2), and optionally a α-nucleating agent (NA) in an extruder.

* * * * *